(No Model.)
J. E. HENRY.
LOGGING CAR.
No. 473,748.  Patented Apr. 26, 1892.
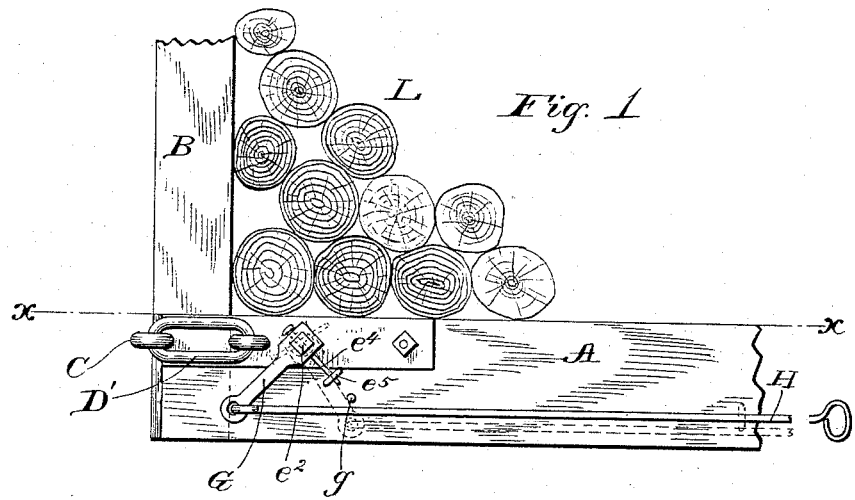
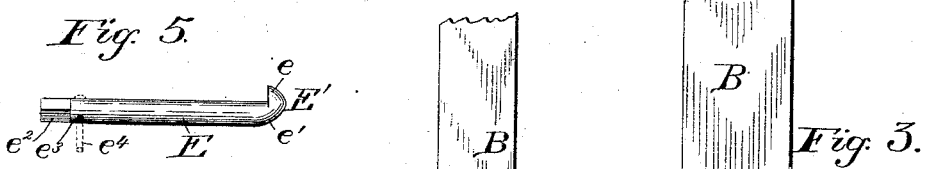
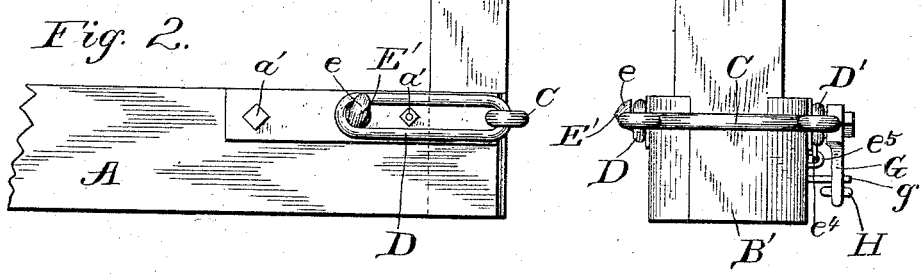
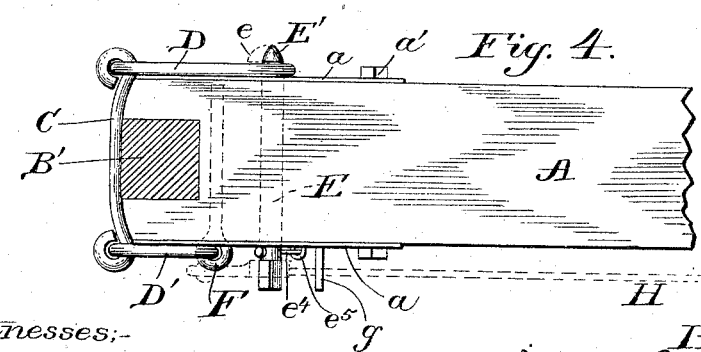
Witnesses:
Percy C. Bowen
John C. Wilson
Inventor:
James E. Henry
By Whitman & Wilkinson
Attorneys.
THE NORRIS PETERS CO., PHOTO-LITHO., WASHINGTON, D. C.

UNITED STATES PATENT OFFICE.

JAMES E. HENRY, OF ZEALAND, NEW HAMPSHIRE.

LOGGING-CAR.

SPECIFICATION forming part of Letters Patent No. 473,748, dated April 26, 1892.

Application filed January 20, 1892. Serial No. 418,674. (No model.)

*To all whom it may concern:*

Be it known that I, JAMES E. HENRY, a citizen of the United States, residing at Zealand, in the county of Coos and State of New Hampshire, have invented certain new and useful Improvements in Logging-Cars; and I do hereby declare the following to be a full, clear, and exact description of the invention, such as will enable others skilled in the art to which it appertains to make and use the same.

My invention relates to certain improvements in logging-cars; and it consists of a simple device for letting down one side of the car from the opposite side, whereby the operator is protected against possible injury from the falling logs.

The device will be understood by reference to the accompanying drawings, wherein the same parts are indicated by the same letters in all the figures.

Figure 1 represents a vertical projection of one of the transverse timbers of a logging-car with the stake or upright mounted therein and a number of logs stacked against and pressing said stake outward. Fig. 2 represents a vertical projection of the opposite side of said timber. Fig. 3 represents an end view of a timber and stake as seen from the left in Fig. 1. Fig. 4 represents a section of Fig. 1 along the line $x\,x$, and Fig. 5 represents a view of the rock-shaft or revoluble hook-pin or bolt.

A represents a timber of the logging-car cut out at its end to receive the heel B' of the upright piece B. This timber A is preferably protected against wear by side plates $a$, secured thereto by bolts $a'$.

The upright B is held against pressure outward by a bridle composed of the eye-rod C and the links D and D', which links pass over the end E' of the revoluble bolt, hook-pin, or rock-shaft E and through the eye in the bolt F, respectively. The rock-shaft E has a hook $e$ on its end E', adapted to catch the link D, and the back $e'$ of said hook tapers to allow the link D to slip off freely when the hook $e$ is turned away from the end of the link D. The opposite end $e^2$ of the rock-shaft E is squared to engage a crank G, actuated by a hand-rod H, leading to the opposite side of the car. To prevent the accidental release of the link D from the catch $e$ and the fall of the upright B, the rock-shaft E is provided with a hole $e^3$, adapted to receive the safety-pin $e^4$, which engages in the eyebolt $e^5$. As long as this safety-pin is in place the rock-shaft E cannot be turned by any ordinary force.

$g$ is a stop-pin for the crank G to prevent the catch $e$ from being turned down below the horizontal position and so engaging the lower part of the link D.

The operation of the device is as follows: The upright B is put in place, the rock-shaft E is turned so as to have the catch $e$ in the position shown in the dotted lines in Fig. 4, and the link D is slipped over the rear edge $e'$ of the end E' of said bolt. The rock-shaft is then turned until the hook $e'$ engages the link D, when the safety-pin $e^4$ is put in. Logs may be then piled up against the upright B, as shown in Fig. 1. When it is desired to let down the side of the car, the operator removes the safety-pin and then going to the other side of the car pulls the hand-rod H until the back $e'$ of the hook $e$ of the rock-shaft E is turned to the link D. The pressure at once forces the link over the tapered surface $e'$, the eye-rod C falls out of the way, the upright B falls backward, and the logs are free to roll off. It will be seen that the operator may pass beneath the car to remove the safety-pin; but, provided the same man removes the safety-pin and pulls the hand-rod, there can be no possibility of accident due to premature fall of the logs from the car.

It will be obvious that the device may be applied to either or both sides of the car and that it may be duplicated at either end of the car.

Having thus described my invention, what I claim, and desire to secure by Letters Patent of the United States, is—

1. An apparatus for unloading logging-cars, consisting of one or more cross-timbers fitted with mortises opening outward in their outer ends, an upright having its heel adapted to fit in said mortise, a bridle for holding said upright in place, and mechanism actuated from the opposite side of the car for letting go said bridle and releasing said upright, substantially as described.

2. An apparatus for unloading logging-cars, consisting of one or more cross-timbers fitted with mortises opening outward in their outer ends and an upright having its heel adapted to fit in said mortise, a bridle permanently connected at one end and detachably connected at the other end to said timber, the said bridle holding said upright in place, a rock-shaft having a hook at one end, adapted to engage the detachable end of said bridle, and a crank and hand-rod for actuating said rock-shaft, substantially as described.

3. An apparatus for unloading logging-cars, consisting of one or more cross-timbers fitted with mortises opening outward in their outer ends, and an upright having its heel adapted to fit in said mortise, a bridle permanently connected at one end and detachably connected at the other end to said timber, the said bridle holding said upright in place, a rock-shaft having a hook at one end, adapted to engage the detachable end of said bridle, a detachable safety-pin passing through said rock-shaft and normally engaging an eyebolt in said cross-timber, and a crank and hand-rod for actuating said rock-shaft, substantially as described.

In testimony whereof I affix my signature in presence of two witnesses.

JAMES E. HENRY.

Witnesses:
CHAS. L. STONEHOUSE,
J. H. HENRY.